Dec. 5, 1933.  R. A. TELFORD  1,938,443
ENGINE GOVERNOR
Filed Sept. 21, 1932
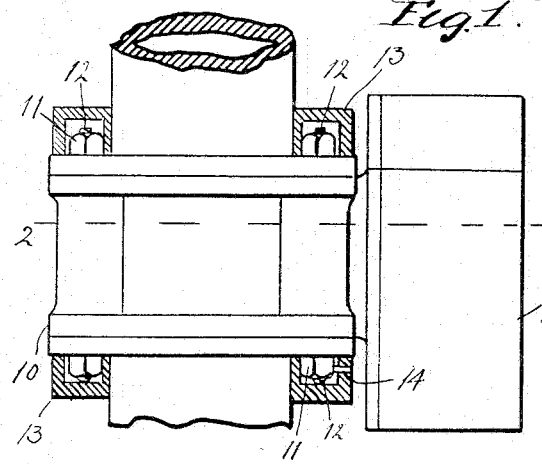
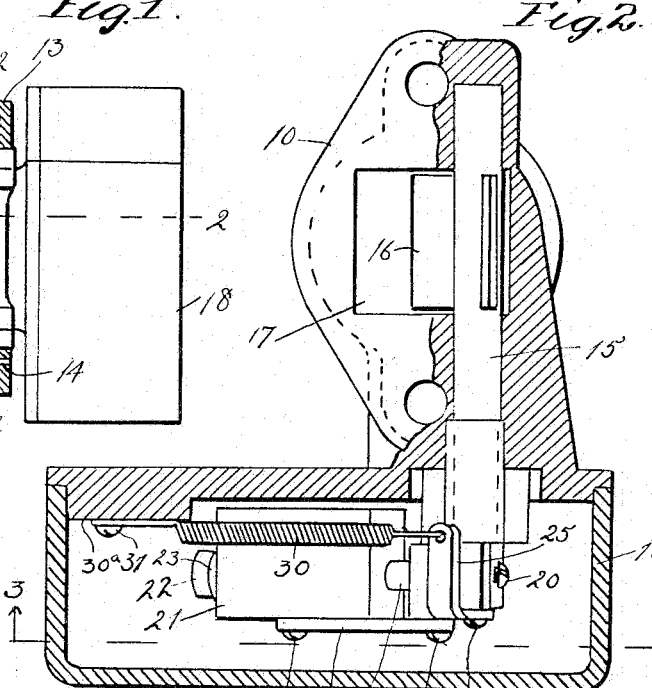
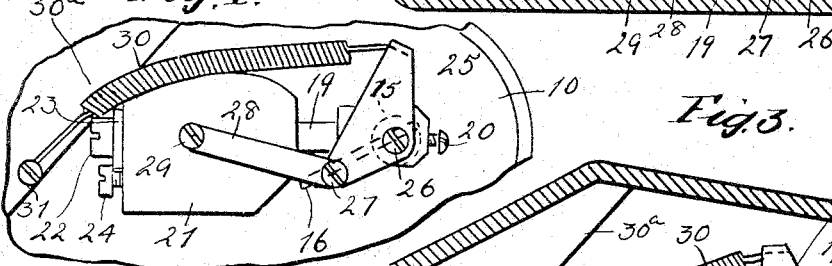
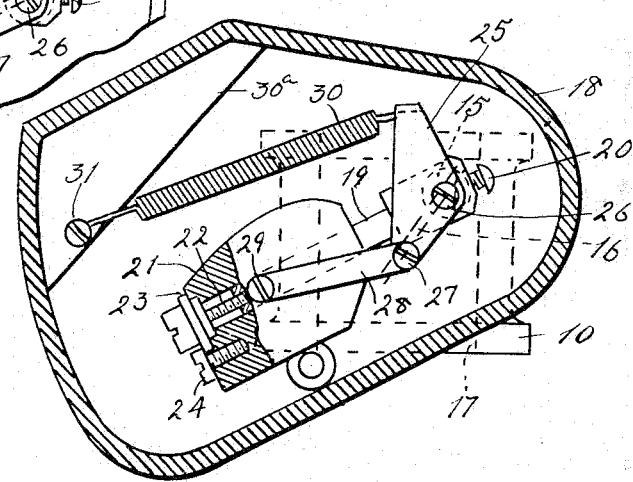
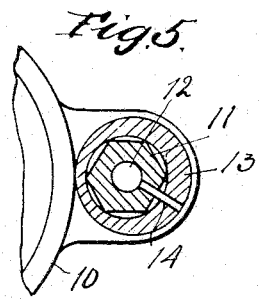
Inventor
Roy A. Telford
By W. W. Williamson
Atty.

Patented Dec. 5, 1933

1,938,443

UNITED STATES PATENT OFFICE 1,938,443

ENGINE GOVERNOR

Roy A. Telford, Philadelphia, Pa.

Application September 21, 1932
Serial No. 634,174

3 Claims. (Cl. 137—152)

My invention relates to new and useful improvements in a governor for internal combustion engines, especially for such engines when used as vehicle motors, and has for its object to provide a simple and effective device whereby the maximum speed of a motor vehicle may be predetermined and whereby the control mechanism may be readily set for any desired speed.

A further object of this invention is to provide a control valve with which is connected an arm whereon is slidably mounted a weight for varying the resistance offered to the movement of said valve.

A still further object of the invention is to provide additional resistance to the movements of the valve by the use of a spring member and mechanism coacting with the weight to automatically vary the pull of said spring upon the valve.

A still further object of the invention is to provide a casing in which all of the mechanism is housed and which may be inserted between the carburetor and intake of the engine and also to provide means for so securing the casing in place that it cannot be removed except by the cutting away and destroying of the securing means.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is an elevation of my improved device secured in place between the carburetor and the intake.

Fig. 2 is an enlarged section on the line 2—2 of Fig. 1.

Fig. 3 is a section on the line 3—3 of Fig. 2.

Fig. 4 is a detail view of the control valve actuating mechanism in the position it assumes when the valve is partly closed.

Fig. 5 is an enlarged fragmental view of one flange of the casing showing the nut locking device in horizontal section.

In carrying out my invention as herein embodied, 10 represents a casing provided with top and bottom flanges for insertion in the fuel line between the carburetor and intake of an internal combustion engine and is secured in position against unauthorized removal by the nuts 11 threaded upon the bolts 12, which latter pass through the flanges of the casing and the flanges of the pipe line, and these nuts are provided with enclosing caps 13, the internal bore thereof being eccentric with the outside circumference so that when placed in position the thinner wall of each cap will lie between the nut and the casing, thereby preventing the revolving of the nut or cap. A pin 14 is driven through a suitable hole in the cap and into a suitable hole in the nut so that its outer end is flush with the outer surface of the cap or below said surface. By this arrangement, the casing when secured in place cannot be removed except by cutting away of the caps or otherwise sufficiently destroying them to gain access to the nuts as will be readily understood.

15 represents an oscillating shaft journalled in the walls of the casing and to this shaft the control valve 16 is secured, said valve being adapted to vary the flow of the fuel mixture through the passage 17 of the casing.

The outer end of the shaft 15 extends into the housing 18 carried by the casing and this outer end has secured thereon the arm 19 by means of the set screw 20, and upon the arm 19 is slidably mounted the weight 21, provisions being made for the accurate adjustment of this weight upon the arm by means of the screw 22 being threaded into the end of the arm, said screw being prevented from longitudinal movement independent of the weight by the flange 23 formed upon its head being held against the weight by the head of the screw 24.

25 represents the bell crank lever which is pivoted to the end of the shaft 15 by the screw 26 passing through a suitable hole in said lever and being threaded into the end of said arm. This lever has pivoted thereto at 27 a link 28, which in turn is pivoted at 29 to the weight 21, while the opposite end of the lever 25 has attached thereto one end of the coil spring 30, the opposite end of said coil spring being attached to the housing as at 31. By this construction any adjustment of the weight upon the arm will actuate the bell crank lever through the link and vary the tension of the spring, thereby varying the pull of said spring upon the shaft 15 increasing or decreasing the resistance offered to the turning of the control.

In order that the weight may be limited in its upward swing by coming into contact with a yielding stop, the spring 30 is so positioned relative to the path of the swing of said weight that in its upward movement the weight will contact with the spring as clearly shown in Fig. 4, thus not only providing a cushioning stop for the weight but also increasing the tension upon the valve shaft by increasing the pull upon the spring since the upward movement of the weight after contacting with the spring will deflect the spring, elongating the same, thus increasing its pull. In order that the weight may have a predetermined fixed stop to its upward movement, an offset or rib 30a is so located within the housing that the weight will strike against this rib should it be forced to its upper limit.

This coaction of the weight and spring is of great importance in its effect upon the combined action of these members upon the control valve since it provides for the automatic tensioning of the spring when the weight is adjusted and also provides for greatly increasing the resistance to the upward swing of the weight when said weight reaches a predetermined height.

The suction of the engine in the feed line tends to swing the control valve 16 toward a closed position so that as the speed of the engine increases, thereby increasing the suction in the feed line, the valve will be closed to a greater extent thus automatically reducing the flow of the fuel fluid through said line and this swinging of the valve is opposed by both the heft of the weight and the pull of the coil spring 30, therefore due to determine the maximum speed of the engine. The weight is adjusted upon the arm to a point which will offer the proper amount of resistance to the closing movement of the valve to cause said valve to reduce the flow of the fuel fluid to prevent the engine from running beyond the given speed as will be readily understood.

In practice, the weight is adjusted upon the rod to determine the maximum speed of the engine prior to the insertion of the device in the fuel feed line and when the device is inserted it is secured against unauthorized removal as before described, so as to prevent the driver of the machine from tampering with the mechanism to alter this predetermined maximum speed of the engine.

By actual use, I have found my improved device accurately controls the speed of the engine under all conditions of commercial use.

Of course I do not wish to be limited to the exact details of construction herein shown and described as these may be varied within the limits of the appended claims without departing from the spirit of my invention.

Having thus fully described my invention, what I claim as new and useful is:—

1. A governor for internal combustion engines, comprising a valve for regulating the flow through said line, an adjustable weight for applying a pull to the valve in the reverse direction from the pull of the fluid fuel upon said valve, a spring for giving an added pull upon the valve in the direction of the weight pull, and means for increasing and decreasing the pull of the spring upon the valve in unison with the adjustments of the weight.

2. In a device of the character described, a casing for insertion in the fuel line of an internal combustion engine, means for securing said casing in position against removal except by the partial destruction of said securing means, a housing carried by the casing, a shaft journalled in the casing and extending into the housing, a valve carried by the shaft and located within the passageway in the casing, an arm secured upon the shaft within the housing, a weight slidably mounted upon the arm, means for adjusting said weight upon the arm, a lever pivoted to the shaft, a link connecting one end of said lever with the weight, and a spring, one end of which is connected with the opposite end of the lever, the other end of said spring being anchored within the housing.

3. In a device of the character described, a casing having a passageway therethrough, a shaft journalled in the casing, a valve carried by the shaft, said valve being located within the passageway for regulating the flow of fuel fluid through the passageway, a housing carried by the casing, an arm secured upon the shaft within the housing, a weight slidably mounted upon said arm, a screw threaded into the arm for adjusting the weight, a second screw threaded into the weight and overlapping a flange carried by the first named screw causing the weight to move back and forth with the first named screw, a lever pivoted to the shaft, a link connecting one end of the lever to the weight and a spring, one end of which is connected to the opposite end of the lever, the other end thereof being anchored within the housing, said spring being located in the path of the swinging movement of the weight so that the weight at a predetermined point in its upward movement will contact with said spring in such manner that further upward movement of the weight will increase the tension of the spring upon the shaft.

ROY A. TELFORD.